United States Patent [19]

Gallup et al.

[11] Patent Number: 5,182,027

[45] Date of Patent: Jan. 26, 1993

[54] PROCESS FOR TREATING AMMONIA AND NITRITE CONTAINING WATERS TO REDUCE NITROGEN OXIDE EMISSIONS THEREFROM

[75] Inventors: Darrell L. Gallup, Chino Hills; John L. Featherstone, El Centro, both of Calif.

[73] Assignee: Union Oil Company of California, Los Angeles, Calif.

[21] Appl. No.: 560,422

[22] Filed: Jul. 31, 1990

Related U.S. Application Data

[63] Continuation-in-part of Ser. No. 345,177, May 1, 1989, Pat. No. 5,032,284, and a continuation-in-part of Ser. No. 226,039, Jul. 29, 1988, Pat. No. 5,061,373, and a continuation-in-part of Ser. No. 473,226, Feb. 12, 1990, Pat. No. 5,024,769.

[51] Int. Cl.$^5$ .............................................. C02F 1/76
[52] U.S. Cl. ................................ 210/696; 210/755; 210/763; 210/764; 210/903; 423/396; 423/398; 423/DIG. 19
[58] Field of Search .............................. 60/641.2, 641.5; 210/696, 698, 747, 752, 755, 758, 763, 764, 903, 916, 761, 762; 423/224, 235, 237, 544, 571, 395, 396, 398, DIG. 19; 252/187.1, 187.2, 187.33, 187.34

[56] References Cited

U.S. PATENT DOCUMENTS

| | | | |
|---|---|---|---|
| 3,340,182 | 9/1967 | Berkman et al. | 210/903 |
| 3,753,675 | 8/1973 | Young | 423/396 |
| 4,455,287 | 6/1984 | Primack et al. | 210/764 |
| 4,564,458 | 1/1986 | Burleson | 210/761 |
| 4,751,005 | 6/1988 | Mitsui et al. | 210/762 |
| 4,861,497 | 8/1989 | Welch et al. | 210/762 |
| 4,863,705 | 9/1989 | Epperly et al. | 423/235 |
| 5,024,769 | 6/1991 | Gallup | 210/763 |
| 5,028,340 | 7/1991 | Gallup | 210/755 |
| 5,032,284 | 7/1991 | Gallup et al. | 210/752 |
| 5,061,373 | 10/1991 | Gallup | 210/755 |

FOREIGN PATENT DOCUMENTS 55-86584  6/1980  Japan .................................. 210/762

*Primary Examiner*—Robert A. Dawson
*Assistant Examiner*—Joseph Drodge
*Attorney, Agent, or Firm*—Gregory F. Wirzbicki; Clark E. DeLarvin

[57] ABSTRACT

A process is provided for controlling the emission of nitrogen dioxide from, and the growth of living organisms in, steam condensate cooling towers and catch basins used in conjunction with a condensate of steam derived from an ammonia containing geothermal brine. The process comprises contacting the condensate, in a substantially continuous manner, with a less-than-stoichiometric amount of an oxidizing agent, which results in the oxidation of nitrite in the condensate to a nitrate. The process optionally provides for periodically introducing a biocide into the condensate in an amount which controls organism growth in the cooling tower and catch basin. To prevent system corrosion, the process may include treating the condensate with a non-organic, phosphate-based corrosion inhibitor and scale dispersant.

60 Claims, No Drawings

PROCESS FOR TREATING AMMONIA AND NITRITE CONTAINING WATERS TO REDUCE NITROGEN OXIDE EMISSIONS THEREFROM

CROSS REFERENCE TO RELATED APPLICATIONS

This application is a continuation-in-part of U.S. Ser. No. 07/345,177 filed May 1, 1989 now U.S. Pat. No. 5,032,2084 and U.S. Ser. No. 07/226,039 filed Jul. 29, 1988 now U.S. Pat. No. 5,061,873 and U.S. Ser. No. 07/473,226 filed Feb. 12, 1990 U.S. Pat. No. 5,024,769, which latter application is a continuation-in-part of said U.S. Ser. Nos. 07/345,177 and 07/473,226; all of said applications being incorporated herein by reference in their entireties.

BACKGROUND OF THE INVENTION

1. Field of the Invention

The present invention relates generally to processes for controlling the emission of nitrogen containing oxides from, and the growth of organisms, such as bacteria and algae, in, open cooling towers and the like in which ammonia and nitrite-containing waters are cooled.

2. Background Discussion

General processes by which geothermal brine can be used to generate electric power have, of course, been known for some time. Geothermal brine, having a wellhead temperature of over about 400° F. and a wellhead pressure of over about 400 psig, for example, can be flashed to a reduced pressure to convert some of the water or brine into steam. Steam produced in this manner is generally used in conventional steam turbine-type power generators to generate electricity.

Cooler, less pressurized, geothermal brine can be used in a closed-loop, binary fluid system in which a low-boiling point, secondary liquid is vaporized by the hot brine. The vapor produced from the secondary liquid is then used in a gas turbine-type power generator to generate electricity, the vapor being recondensed and reused.

In both such cases, the "used" geothermal brine is most commonly reinjected into the ground to replenish the aquifer from which it was extracted and to prevent ground subsidence. Reinjection of geothermal brine is also important to avoid the problems associated with the disposal of the large amounts of saline and usually highly-contaminated liquid involved.

One of the many problems which has added to the overall cost of producing electric power by the use of geothermal brines relates to the undesirable emission of nitrogen dioxide ($NO_2$). The nitrogen dioxide results from the oxidation of ammonia in the brine by naturally occurring bacteria therein which produce nitrites. Nitrites can also produce acids which are quite corrosive to the cooling system and disposal piping.

It is important that any new process for controlling nitrogen and/or sulfur oxide emissions from, and the growth of organisms in, steam condensate handling portions of geothermal brine power plants be effective to avoid penalties for excessive emissions, but that it also be economical to use. If a process is effective for controlling such emissions and organism growth but is uneconomical, the process is of little practical use in an actual geothermal brine power plant.

SUMMARY OF THE INVENTION

According to the present invention, an effective and economical process is provided for controlling the emission of nitrogen dioxide, oxides and, in particular, nitrogen growth of organisms in, a system for handling a flow of condensate of steam, derived from a nitrite- and ammonia-containing water. The process comprises contacting the water with a sufficient amount of an oxidizing agent to substantially prevent the emission of nitrogen oxides from the system. The amount of oxidizing agent used is substantially less than the stoichiometric amount which would be required to oxidize all the nitrite to nitrate. The preferred oxidizing agents are sold commercially as oxidizing biocides, but the amount used is so small it generally does not substantially inhibit the growth of any organisms, such as algae, bacteria and fungi, which might be in the water. When such organisms are present, the invention further provides for their control by contacting the water, in a periodic manner, with a sufficient amount of a biocide to substantially reduce the concentration of live organisms in the system.

As used herein the term "biocide" includes biostats (which stop or retard the growth of organisms such as bacteria algae and fungi without necessarily killing them), and therefore includes, without limitation, bacteriacides, bacteriastats, algicides, algistats, fungicides, and fungistats.

Also as used herein, the expression "not substantially inhibit" means that the nominal growth rate of organisms, such as bacteria, fungi and algae, growing in the water, as observed prior to the addition of the oxidizing agent, is reduced less than about 10 percent after the biocide is applied, and "substantially reduce" means at least about 90 percent of the organisms are destroyed.

It has been found that the amount of oxidizing agent required to oxidize the nitrites and all other oxidizable species present is very small compared to the stoichiometric amount which theoretically would be required. Apparently, some catalytic effect is involved which produces the desired oxidation of the nitrite and all other oxidizable species. Not only is the amount insufficient to oxidize all oxidizable species present in the water, but it is usually far less than that required to oxidize a single oxidizable species i.e., nitrite ions.

Typically, less than about 10 percent and generally, less than about 1 percent of the stoichiometric amount of oxidizing agent needed to effect substantially complete oxidation of the nitrite to nitrate is employed. In the case of geothermal brines, amounts within the range of about 0.01 percent to about 10.0 percent, and preferably within the range from about 0.2 percent to 2.0 percent of the stoichiometric amount, have been found to be highly effective. These amounts routinely result in the abatement of at least 50 percent, generally in excess of 80 percent, more often in excess of 90 percent, and frequently at least 99 percent of emissions of the nitrogen oxides, and in particular of nitrogen dioxide. Such abatement generally correlates to a corresponding conversions of at least 50 percent, 80 percent, 90 percent and 99 percent of the nitrite in the aqueous media to nitrate. Although it is believed that the nitrogen dioxide abatement is directly related to the percent of oxidation of nitrite to nitrate, the invention is bound by neither this nor any other theory.

In some instances, the amount of oxidizing agent used may be sufficient to inhibit the growth of, or control the concentration of organisms in, the water. Generally, however, the preferred amounts of oxidizing agent utilized are so small that they are substantially ineffective as a biocide. Thus, the preferred amounts of oxidizing agent do not control or even substantially inhibit the growth of living organisms. Where such control is desired, an additional treatment is required. The additional treatment may comprise increasing the amount of oxidizing agent or the use of a non-oxidizing biocide.

The oxidizing agents suitable for use in the present invention contain at least one

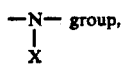
—N— group,
|
X wherein is a halogen.

A particularly preferred agent is selected from the group consisting of trichloro-isocyanuric acid and salts thereof, 1-bromo-3-chloro-5,5-dimethyl-hydantoin and salts thereof, and other halogenated substituted hydantoins, and mixtures thereof. The most preferred agent, on the basis of availability, cost and effectiveness, is trichloro-isocyanuric acid.

Generally, between about 0.5 and about 20 PPMW (parts per million by weight) relative to the water, and preferably between about 0.5 and about 5 PPMW, of the oxidizing agent is added.

To control the growth of organisms in the water a biocide preferably is added at periodic intervals. Typically, an amount sufficient to provide between about 25 and 200 PPMW of the biocide, relative to the water, is added, at intervals of about 1 week to about 4 weeks, to reduce the concentration of organism to below about 10,000 per liter.

The biocide may be added to the water when or after the concentration of organisms reaches a predetermined level, for example, between about 1 million and about 10 million per liter. Preferably, a sufficient amount of biocide is added to the water to reduce the concentration of live organisms to less than about 10,000 per liter.

The present invention is particularly useful in systems for handling a condensate of steam derived from an ammonia-containing geothermal brine.

DETAILED DESCRIPTION OF THE INVENTION

For convenience, the present invention will be described with respect to a particularly preferred application, namely, for a system in which a geothermal brine is used to generate electrical power and in which the geothermal brine utilized contains ammonia. The brine may also contain significant quantities of other oxidizable species including, among others, sulfides, sulfites and their precursors. In such a system, brine from a geothermal well is first introduced into a zone of reduced pressure (flashed) to produce two phases, a gas phase and a liquid phase. The gas phase principally comprises steam along with a minor amount of non-condensible gases, both of which are passed through a steam turbine which drives a generator to produce electric power.

The effluent steam from the turbine is introduced into a condenser, in which at least some of the steam is condensed to form a condensate and from which the non-condensible gases are discharged. The condensate is circulated through at least one open cooling tower. Generally, the cooling tower will have associated therewith a condensate catch basin and a sump. Meanwhile, the liquid phase, referred to as the rejected brine, may be passed through one or more additional zones of reduced pressure to produce additional steam. Under ideal circumstances, the condensate and the rejected brine ultimately are combined in the sump for disposal by reinjection into a well.

During operation of the system, a sludge is formed in the cooling tower and catch basin. The sludge is the result of entrainment of air borne dust particles and air borne living organisms, the latter of which grow very rapidly in the hot, wet environment of the cooling tower and condensate catch basin. The sludge so formed also contains entrained steam condensate along with the various elements dissolved therein. For a more detailed description of geothermal brine processing and brine constituents, see, for example, METHOD FOR THE PRODUCTION OF USABLE STEAM AND NON-TOXIC SOLIDS FROM GEOTHERMAL BRINE, U.S. Pat. No. 4,763,479 issued Aug. 16, 1988 and assigned to the assignee of the present invention, which is incorporated herein by reference in its entirety.

In accordance with the present invention, the condensate is treated with a small amount of an oxidizing agent. Among the suitable oxidizing agents for use in the present invention are those having at least one

—N—
|
X (haloimine) group wherein X is a halogen. Preferred agents have an

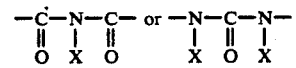
—C—N—C— or —N—C—N—
‖ | ‖        |  ‖  |
O X O        X  O  X group and the even more preferred agents have a

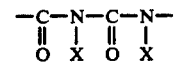
—C—N—C—N—
‖ | ‖ |
O X O X group, wherein in each instance X is the same or different halogen. The preferred halogens are chlorine and bromine. It will be noted that in the particularly preferred agents no two haloimine groups are bonded to one another.

Generally, the oxidizing agents are organic compounds containing the above-described haloimine or haloimine-carbonyl functionality and at least about 3, generally from about 3 to about 20, and preferably from 3 to about 15 atoms other than hydrogen, i.e., carbon, heteroatoms such as S, O, N, etc., and pendant functional groups, e.g., oxy, thioxy, amino, thiol groups and/or organic radicals.

The preferred oxidizing agents of the present invention are characterized by a heterocyclic ring structure comprising carbon and nitrogen atoms. Affixed to the ring structure is at least one and preferably two or more halogen atoms. Thus, the oxidizing agents of the present invention may be described as halogenated-organic, oxidizing agents or more specifically, as halogenated-heterocyclic, organic, oxidizing agents.

The most preferred oxidizing agent for use in accordance with the present invention comprises a ring structure and may be characterized by the following general formula:

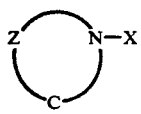

wherein X is a halogen, Y is oxygen or sulfur and Z is a divalent radical of from 3 to 10, preferably 3 to 8, more preferably 3 to 4 atoms in length, forming the ring structure. The ring structure preferably consists of alternate nitrogen and carbon atoms. Typical ring structures are triazine and oxidiazole. Typically, each nitrogen atom of the ring structure is substituted with a halogen. The carbon atoms are generally bonded to one or more members of the group consisting of hydrogen, oxygen, chlorine, bromine and $C_1$ to $C_6$ organic radicals. The organic radicals are preferably aliphatic radicals, more preferably substituted or un-substituted alkyl radicals, and even more preferably un-substituted alkyl radicals having 1 to 3 carbon atoms, with methyl being most preferred. The preferred halogens, based upon their availability, are chlorine and bromine.

A noteworthy aspect of the ring structures of the preferred oxidizing agents is that they include oxycarbonyls adjacent each side of at least one of the halogen-substituted nitrogen atoms. The preferred agents further include a halogen-substituted nitrogen atom adjacent each side of at least one of the oxycarbonyls. Two preferred agents have the following chemical structure:

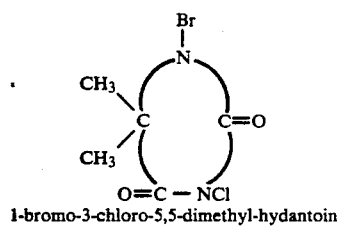
1-bromo-3-chloro-5,5-dimethyl-hydantoin

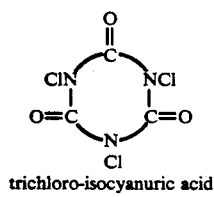
trichloro-isocyanuric acid

It is readily seen that these two structures fulfill the foregoing definitions with respect to the constituents of the ring structure, the preferred halogen, and location of oxycarbonyls relative to halogen-substituted nitrogen.

In the invention, the foregoing oxidizing agents are employed in aqueous media, such as geothermal brine, to prevent release of nitrogen oxides from precursors thereof in the aqueous media, in particular nitrite ions. For a geothermal facility employing the brine as a source of steam, the oxidizing agent preferably is introduced into the brine in the cooling tower or the cooling tower catch basin in a substantially continuous manner. Other introduction methods, including intermittent introduction, however, are considered to be within the scope of the invention. The reason geothermal brines in particular, confront one with the difficulty of nitrogen oxide emissions is due to bacteria growing in the cooling tower.

Many types of air-borne organisms have been found to grow at a very rapid rate in the hot, wet environment of cooling tower and condensate catch basin. As an example, among the bacteria usually found in cooling tower and catch basin when ammonium compounds are present are nitrifying bacteria such as Nitrosomonas and Nitrobacter. These bacteria consume ammonia in the cooling tower and produce nitric and nitrous acids which thereby add to system corrosion problems. The acids produce nitrogen dioxide emissions when the condensate contacts iron ions, for example, when the condensate is combined with iron-containing brine in the sump.

It has been determined that nitrogen dioxide emissions from, and the growth of organisms in cooling tower, catch basin and sump, are effectively controlled in an economic manner by the present process without creating any new problems.

The oxidizing agent preferably is added to the condensate in a continuous or substantially continuous manner. One way to accomplish this is to introduce a stream containing the agent in a relatively small concentration into the condensate in a continuous, or at least a substantially continuous, manner. Preferably it is introduced at a rate effective for substantially eliminating the formation of reactive nitrite, but without substantially inhibiting the growth of living organisms. An alternative way to accomplish continuous or substantially continuous introduction is by periodically adding a slowly-dissolving pellet or pellets of solid oxidizing agent into the cooling tower or catch basin.

In the preferred embodiment the oxidizing agent is added to the condensate on a continuous basis in an amount sufficient to abate emissions of nitrogen oxide, in particular nitrogen dioxide. In general the amount so needed does not substantially inhibit the growth of algae, fungi and bacteria in the cooling tower and/or catch basin. Although greater quantities of the oxidizing agent could be continuously added to the condensate to completely inhibit the growth of organisms in the cooling tower and catch basin, the resulting process would be excessively expensive. Further, it is not considered essential, in the present invention, to continuously control the growth of the organisms in the system.

It is thus preferred to control the growth of these organisms on a periodic basis by adding to the condensate a relatively large, "shock" amount of a biocide on a weekly or monthly basis. The periodic shock treatment results in an increasing organism concentration, permitted by the continuous addition to the condensate of only small amounts of the oxidizing agent, followed by a rapid decrease in the concentration of organisms caused by the periodic addition of a large amount of the biocide. The periodic shock treatment typically reduces the total organism concentration from a high value (1 to 10 million/liter) to under 10,000/liter. Thus, the treatment provides at least a 90% and generally at least about a 99 percent reduction in the organisms concentration.

The described process of periodically adding significant amounts of the biocide to the condensate has been found to be more cost effective than continually adding a larger amount of the oxidizing agent or a biocide to constantly control the growth of organisms.

As can be appreciated, the actual amounts of the biocide and the intervals between its addition depend upon the organism growth characteristics, which may, in turn, depend upon such factors as the geographic location of power plant, the temperature in the cooling tower and catch basin, and the type(s) of organisms present. However, the amounts and intervals can be readily determined for a particular cooling tower and catch basin by the simple expedient of measuring the live bacteria count therein from time to time. Preferred, however, are additions of sufficient biocide which allow for intervals of between about 1 and about 4 weeks.

The shock biocide can be the same as the oxidizing agent. Based on cost, however, it is preferred that it be a non-oxidizing biocide and that it be selected from dodecylguanidine hydrochloride, isothiazalone, and mixtures thereof.

A corrosion inhibitor, which is preferably a non-heavy metal inhibitor selected from an inorganic phosphate passivator and scale dispersant, such as Betz Dianodic II, may be added to the condensate in the cooling tower, catch basin or both. It is preferred that the corrosion inhibitor be added to the condensate in a concentration between about 10 and about 50, and more preferably a concentration of between about 18 and about 28, PPMW relative to the condensate.

As used herein, the concentration notation "PPMW relative to the condensate" (regardless of the additive material involved) is to be understood to mean the concentration of the added material (whether it is fully dissolved, partially dissolved or not dissolved at all) in parts per million by weight relative to the total volume of the condensate handling system, including condensers, cooling tower, catch basin, sums and conduits. This is the case even though condensate is continually being added from condensers and condensate is continually being removed by evaporation in the cooling tower. Also, the biocide added may not go into solution immediately. Thus, an extracted sample of the condensate would generally not actually have the stated concentration of the added material. Such a designation for concentration of added, partially dissolved materials is, however, consistent with the standard practices followed in the water treatment industry.

If the oxidizing agent were to oxidize all the nitrite in the steam condensate to nitrate by direct chemical reaction, one would expect to need at least a stoichiometric amount of the oxidizing agent for oxidizing the nitrites. For example, for trichloro-isocyanuric acid and hydantoin biocides, respectively, the stoichiometric amount would be in accordance with the following reactions:

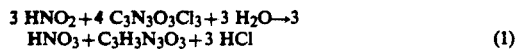

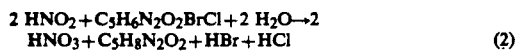

with other acids such as hydrochloric and acids also being possibly formed.

Since geothermal brines contain substantial quantities of oxidizable species such as arsenic, sulfide, sulfite, etc., one would expect to need to add more than the stoichiometric amount for the conversion of all oxidizable species in order to ensure that no nitrogen dioxide was released from the brine.

However, it has been surprisingly found the far less than stoichiometric amount for oxidizing all oxidizable species is required to obtain excellent results. For example, for a Salton Sea geothermal brine, an effective amount was found to be within the range of from about 0.1 to about 0.5 percent of the theoretical stoichiometric amount required for oxidation of all oxidizable species present in the brine.

It also would be expected that the amount of oxidizing agent required to prevent the formation of nitrites in the condensate would be at least the stoichiometric amount for reacting with the nitrite ions in accordance with reaction equations such as (1) and (2) above.

It was, however, unexpectedly and surprisingly discovered that the amount of oxidizing agent needed to reduce the nitrite ion concentration to less than about 10 percent, preferably to less than about 5 percent, more preferably to less than about 1 percent, and most preferably to less than about 0.5 percent of the nitrite ions entering into the cooling tower and catch basin, is only an extremely small percentage (for example, only about 0.05 to about 0.1 percent) of the stoichiometric amount of oxidizing agent for the conversion of the nitrite ions. Even with such low stoichiometric amounts nitrogen dioxide emissions are reduced by at least 80 percent, generally by at least 90 percent and frequently by about at least 99 percent. In addition, these small amounts also concurrently abate hydrogen sulfide emissions (as taught in parent application U.S. Ser. No. 07/226,039) and convert arsenious acid to a less toxic, stable compound (as taught in parent application U.S. Ser. No. 07/473,226).

Why only such a small amount of oxidizing agent is needed to completely oxidize the nitrites present and, therefore, eliminate NO$_2$ emissions is not completely understood. Apparently, the agent (possibly in conjunction with the small amounts of some materials, such as heavy metals, carried over into the condensate from the geothermal brine) functions as a catalyst in the oxidation of the nitrite by oxygen. Oxygen in the condensate (for example, from air picked up as the condensate cascades through cooling tower 156) could react with nitrite in accordance with the following reaction:

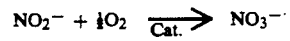

The theory that a catalytic reaction is somehow involved is borne out by the observation that much less oxidation of the nitrite in the condensate occurs in the absence of small amounts of the oxidizing agent. It is, of course, to be understood that the present invention is not to be held to this or to any other theory of operation.

A key aspect of the present invention is that, while the requirement for a stoichiometric amount of oxidizing agent would not be economically feasable, the invention does not require such an amount. The amount of oxidizing agent is so small that abatement of nitrogen oxides is obtained at a modest cost.

The present invention may be further described with reference to the following Example.

EXAMPLE

A two-phase mixture of a Salton Sea geothermal brine and steam, at a wellhead temperature of about 450° F. and a wellhead pressure of about 450 psig, is extracted at a rate of about one million pounds per hour from a brine production well. The two-phase mixture has a hydrogen sulfide concentration of about 10 PPMW, an ammonia concentration of about 350 PPMW, and a carbon dioxide concentration of 2000 ppmw (relative to the two-phase mixture from the well).

The two phase mixture is flashed to produce about 180,000 to 220,000 pounds per hour of steam which is supplied to a steam turbine. The steam includes about 10 pounds per hour of hydrogen sulfide (as a non-condensable gas), about 1600 pounds per hour of carbon dioxide, and about 50 pounds per hour of ammonia, also as non-condensable gases.

After exiting the turbine, the steam is condensed and about 47 pounds per hour of the ammonia enters the condensate to form ammonium carbonate. The pH of the condensate is about 9.0.

Betz Dianodic II corrosion inhibitor is added to the condensate in a catch basin to provide an inhibitor concentration of between about 18 and about 28 PPMW relative to the condensate.

Between about 1 and about 4 pounds per day of oxidizing agent (1-bromo-3-chloro-5,5-dimethyl-hydantoin) is added to the condensate in the catch basin to provide a concentration of between about 1 and about 4 PPMW relative to the condensate. The agent is added in the form of one or more pellets, weighing about 0.6 pounds each, which slowly dissolve in the condensate over about a 24 hour period. Since steam is provided at a rate of between about 4.32 million and about 5.28 million pounds in a 24 hour period, the oxidizing biocide is added to the condensate at a rate which can be considered to be between about 0.18 and about 0.93 PPMW relative to the flow of steam. With the addition of between about 1 and about 4 pounds of oxidizing agent a day into the condensate, the formation of nitrite in the cooling tower and catch basin is essentially eliminated. This completely eliminates the potential for $NO_2$ emission when the condensate mixes with the brine in a sump prior to disposal in a dedicated injection well.

The stoichiometric amount of the above-mentioned hydantoin oxidizing agent required, in accordance with reaction (2), to oxidize all the nitrite in the condensate formed from 47 pounds per hour of ammonia is calculated to be about 13 pounds per hour, or about 300 pounds per day. The amount of hydantoin oxidizing agent actually required to substantially eliminate the nitrite from the condensate (based solely on the nitrite content) is between about 0.3 and about 1.3 percent of the stoichiometric amount of oxidizing agent expected to be required.

Isothiazalone is used as the organism control biocide and is added to the condensate in the catch basin about every two weeks in an amount sufficient to provide a concentration of about 50 PPM relative to the condensate.

The addition of the above-described amounts of the hydantoin oxidizing agent and Isothiazalone biocides is found to effectively control the growth of organisms in the cooling tower and catch basin.

Although there has been described above a preferred embodiment of the invention for controlling the emission of $NO_2$ from, and nitrite formation and the growth of organisms such as algae, fungi and bacteria in, a system for handling steam and steam condensate derived from ammonia-containing geothermal brine for the purpose of illustration, it will be appreciated that the invention is not limited thereto. Accordingly, the invention may be used in any facility producing ammonia containing aqueous streams under circumstances which allow the ammonia to be oxidized to form nitrite compounds. Such streams occur in ammonia plants and plants producing organic nitrogen products such as amines, amides and nitro-compounds, nitrogen containing fertilizers and similar products. Accordingly, these and many other process modifications and variations may occur to those skilled in the art and still be within the scope of the invention as defined by the appended claims.

We claim:

1. A process for treating an aqueous solution containing nitrite to prevent emission of nitrogen dioxide therefore comprising contacting the aqueous solution with an oxidizing agent in an amount substantially less than that which theoretically would be required to react stoichiometrically with substantially all the nitrite in the aqueous solution, wherein said oxidizing agent includes at least one of the groups consisting of

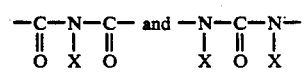

wherein X is a halogen.

2. The process of claim 1 wherein the oxidizing agent contains at least one

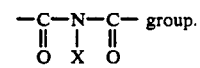

3. The process of claim 2 wherein each carbon atom of the agent is bonded to a member selected from the group consisting of hydrogen, oxygen, chlorine, bromine and $C_1$-$C_6$ organic radicals.

4. The process of claim 3 wherein the oxidizing agent comprises a heterocyclic ring having from 5 to 6 atoms in one ring.

5. The process of claim 1 wherein the oxidizing agent contains at least one

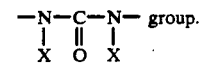

6. The process of claim 1 wherein the oxidizing agent contains at least one

7. The process of claim 1 wherein the oxidizing agent consists of elements selected from the group consisting of nitrogen, hydrogen, carbon, oxygen, bromine and chlorine.

8. The process of claim 1 wherein said oxidizing agent has the general formula

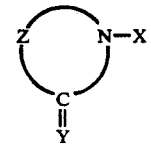

wherein X is a halogen, Y is oxygen or sulfur and Z is a divalent radical of from 3 to about 8 atoms in length.

9. The process of claim 8 wherein the agent comprises a ring structure the ring-forming atoms of which consist of alternate carbon and nitrogen atoms.

10. The process of claim 1 wherein the amount of oxidizing agent is in the range of from about 0.01% to 10% of the theoretical stoichiometric amount required.

11. A process for treating a condensate of steam derived from an aqueous brine containing nitrite, said method comprising contacting said condensate with a halogenated, organic, oxidizing agent in an amount less than the stoichiometric amount required to oxidize all the nitrite in the condensate to nitrate, instead wherein the oxidizing agent includes at least one

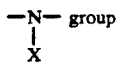

wherein X is a halogen.

12. The process of claim 11 wherein the aqueous condensate derived from a geothermal brine.

13. The process of claim 12 wherein the oxidizing agent contains at least one

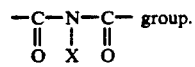

14. The process of claim 12 wherein the oxidizing agent contains at least one

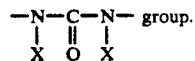

15. The process of claim 12 wherein the oxidizing agent contains at least one

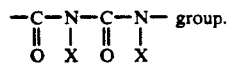

16. The process of claim 15 wherein the oxidizing agent consists of elements selected from the group consisting of nitrogen, hydrogen, carbon, oxygen, bromine and chlorine.

17. The process of claim 16 wherein each carbon atom of the agent is bonded to a member selected from the group consisting of hydrogen, oxygen, chlorine, bromine and $C_1$-$C_6$ organic radicals.

18. The process of claim 17 wherein the oxidizing agent comprises a heterocyclic ring having from 5 to 6 atoms in the ring.

19. The process of claim 12 wherein said oxidizing agent has the general formula:

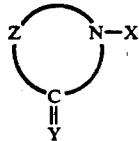

wherein X is a halogen, Y is oxygen or sulfur and Z is a divalent radical of from 3 to about 8 atoms in length.

20. The process of claim 19 wherein the agent comprises a ring structure the ring-forming atoms of which consist of alternate carbon and nitrogen atoms.

21. The process of claim 20 wherein the amount of oxidizing agent is in the range of from about 0.01% to 0.5% of the stoichiometric amount required.

22. The process of claim 19 wherein the condensate is derived from a Salton Sea type geothermal brine.

23. The process of claim 11 wherein the condensate is derived from a Salton Sea type geothermal brine.

24. A process for use in a system for handling a flow of condensate of steam, the condensate containing ammonia and/or ammonia precursors, the process controlling the emission of nitrogen dioxide from, and a concentration of one or more organisms selected from the group consisting of fungi, algae and bacteria growing in, the condensate handling system, the process comprising the steps of:
(a) contacting the condensate, in a substantially continuous manner by introducing into the condensate an amount of an oxidizing agent which substantially prevents the emission of nitrogen dioxide from the condensate handling system but which does not substantially inhibit the growth of said organisms in the condensate handling system, said oxidizing agent having at least one

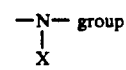

wherein X is a halogen; and
(b) periodically contacting the condensate with an amount of a biocide which substantially reduces the concentration of said organisms.

25. The process of claim 24 wherein the oxidizing agent contains at least one

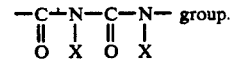

26. The process of claim 25 wherein the oxidizing agent consists of elements selected from the group consisting of nitrogen, hydrogen, carbon, oxygen, bromine and chlorine.

27. The process of claim 26 wherein each carbon atom of the agent bonded to a member selected from the group consisting of hydrogen, oxygen, chlorine, bromine and $C_1$-$C_6$ organic radicals.

28. The process of claim 27 wherein the oxidizing agent comprises a heterocyclic ring having from 5 to 6 atoms in the ring.

29. The process of claim 24 wherein said condensate is derived from a geothermal brine and said oxidizing agent has the general formula:

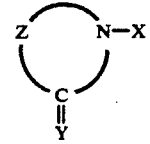

wherein X is a halogen, Y is oxygen or sulfur and Z is a divalent radical of from 3 to about 8 atoms in length.

30. The process of claim 29 wherein the agent comprises a ring structure the ring-forming atoms of which consist of alternate carbon and nitrogen atoms.

31. The process of claim 30 wherein Z is 3 to 4 atoms in length.

32. The process of claim 29 wherein the condensate comprises nitrite and the amount of oxidizing agent is in the range of from about 0.2% to 2% of the theoretical stoichiometric amount required to oxidize all the nitrite in the condensate to nitrate.

33. The process of claim 32 wherein the biocide is added to the condensate in the amount of between about 25 and about 200 PPMW relative to the condensate at intervals of between about 1 and about 4 weeks.

34. The process of claim 29 wherein the condensate is derived from a Salton Sea type geothermal brine.

35. A process for use in a system in which a flow of ammonia-containing steam derived from a geothermal fluid is used to generate electric power, and which includes: (i) at least one steam turbine, (ii) at least one steam condenser downstream of the turbine in which at least some of the steam is condensed to steam condensate and from which non-condensable gases, including ammonia, are discharged, and (iii) at least one cooling tower for cooling the condensate, the cooling tower being open to the atmosphere and having associated therewith a condensate catch basin and a sump, condensate from the condenser containing nitrite and being cooled in the cooling tower for use as make-up water for the condenser, said process (1) inhibiting corrosion of metals contacted by the condensate, (2) controlling the concentration of one or more organisms selected from the group consisting of algae, fungi and bacteria growing in the cooling tower and the catch basin, and (3) controlling the emission of nitrogen dioxide from the cooling tower, said process comprising the steps of:
 (a) introducing into the condensate a corrosion inhibitor which does not substantially abate the emissions of nitrogen dioxide or inhibit the growth of organisms;
 (b) substantially continuously introducing into said condensate an amount of an oxidizing agent, including at least one

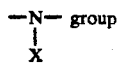  group wherein X is a halogen which substantially prevents the emission of nitrogen dioxide from the system, but which does not substantially inhibit the growth of said organisms; and
 (c) periodically introducing into the condensate an amount of a biocide which substantially reduces the level of said organisms.

36. The process of claim 35 wherein the oxidizing agent contains at least one

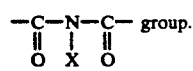 group.

37. The process of claim 35 wherein the oxidizing agent contains at least one

 group.

38. The process of claim 35 wherein the oxidizing agent contains at least one

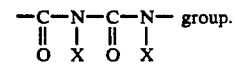 group.

39. The process of claim 35 wherein the oxidizing agent consists of elements selected from the group consisting of nitrogen, hydrogen, carbon, oxygen, bromine and chlorine.

40. The process of claim 35 wherein said condensate contains nitrite, said amount of oxidizing agent is less than the stoichiometric amount required to oxidize all the nitrite to nitrate, and said oxidizing agent has the general formula

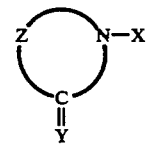

wherein X is a halogen, Y is oxygen or sulfur and Z is a divalent radical of from 3 to about 8 atoms in length.

41. The process of claim 40 wherein the agent comprises a ring structure the ring-forming atoms of which consist of alternate carbon and nitrogen atoms.

42. The process of claim 41 wherein the amount of oxidizing agent is in the range of from about 0.01% to 10% of the theoretical stoichiometric amount required to oxidize all of the nitrite in the condensate to nitrate.

43. The process of claim 42 wherein the biocide is selected from the group consisting of dodecylguanidine hydrochloride, isothiazalone, and mixtures thereof, and is added to the condensate in an amount of between about 50 and about 200 PPMW relative to the condensate.

44. The process of claim 43 wherein, at the conclusion of said biocide addition, the concentration of bacteria, fungi and algae, in organisms/liter, is reduced to less than about 10 percent of the concentration before said biocide was added.

45. A process comprising reducing the emission of one or more oxides of nitrogen from a system handling aqueous liquids containing oxidizable nitrogen components by adding to at least one of said liquids an oxidizing agent which comprises a heterocyclic ring compound having from 5 to 6 atoms in at least one ring in an amount stoichiometrically insufficient to oxidize all the oxidizable nitrogen components in said at least one liquid to nitrates.

46. The process of claim 45 wherein said oxidizing agent has the general formula

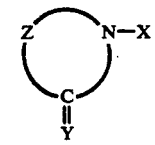

wherein X is a halogen, Y is oxygen or sulfur and Z is a divalent radical of from 3 to about 8 atoms in length.

47. The process of claim 46 wherein the agent comprises a ring structure and consists of alternate carbon and nitrogen atoms.

48. The process of claim 47 wherein the amount of oxidizing agent is in the range of from about 0.01% to 10% of the theoretical stoichiometric amount required.

49. The process of claim 48 wherein the nitrogen components comprise nitrites.

50. The process of claim 49 wherein the amount is less than the stoichiometric amount required to oxidize all the nitrite to nitrate.

51. A process for treating a condensate of steam, derived from an aqueous brine containing nitrite, and a concentration of one or more organisms selected from the group consisting of algae, fungi and bacteria by introducing into said condensate a halogenated, organic, oxidizing biocide in an amount sufficient to result in oxidation of substantially all the nitrite in the condensate, but insufficient to substantially inhibit an increase in the concentration of said organism in said condensate.

52. The process of claim 51 wherein the amount is less than the stoichiometric amount required to oxidize all the nitrite to nitrate.

53. The process of claim 52 wherein the amount of oxidizing biocide is in the range of from about 0.01% to 10% of the theoretical stoichiometric amount required.

54. The process of claim 52 wherein the aqueous brine is a geothermal brine.

55. The process of claim 54 wherein said oxidizing biocide has the general formula

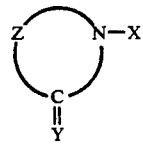

wherein X is a halogen, Y is oxygen or sulfur and Z is a divalent radical of from 3 to about 8 atoms in length.

56. The process of claim 55 wherein the biocide comprises a ring structure and consists of alternate carbon and nitrogen atoms.

57. A process comprising substantially eliminating the emission of one or more oxides of nitrogen from a system handling aqueous geothermal liquid having liquid streams containing oxidizable nitrogen components by adding an oxidizing agent to at least one of said streams in an amount stoichiometrically insufficient to oxidize all the oxidizable nitrogen components theoretically in the at least one stream to nitrates.

58. The process of claim 57 wherein the nitrogen components comprise nitrite and the amount is less than the stoichiometric amount required to oxidize all the nitrite to nitrate.

59. The process of claim 58 wherein the amount of oxidizing agent is in the range of from about 0.01% to 10% of the stoichiometric amount.

60. The process of claim 58 wherein the aqueous brine is a Salton Sea type geothermal brine.

* * * * *

UNITED STATES PATENT AND TRADEMARK OFFICE
CERTIFICATE OF CORRECTION

PATENT NO. : 5,182,027

DATED : January 26, 1993

INVENTOR(S) : Gallup et al.

It is certified that error appears in the above-identified patent and that said Letters Patent is hereby corrected as shown below:

Claim 12, column 11, line 21, after "condensate" insert -- is --.

Signed and Sealed this

Fourteenth Day of December, 1993

Attest:

BRUCE LEHMAN

Attesting Officer — Commissioner of Patents and Trademarks